United States Patent [19]

Mannava et al.

[11] Patent Number: 5,368,911
[45] Date of Patent: Nov. 29, 1994

[54] METHOD FOR FABRICATION OF COMPOSITE MATERIALS AND COMPOSITE

[75] Inventors: Seetharamaiah Mannava, Cincinnati; Vanon D. Pratt, Hamilton, both of Ohio; Henry MacLaren, Marblehead; Joseph J. Jackson, Topsfield, both of Mass.; Patrick M. Kenney, Akron, Ohio

[73] Assignee: General Electric Company, Cincinnati, Ohio

[21] Appl. No.: 858,925

[22] Filed: Mar. 27, 1992

[51] Int. Cl.$^5$ .............................................. B32B 3/28
[52] U.S. Cl. ................................... 428/167; 427/269; 427/270; 427/275; 427/289; 427/292; 427/309; 427/327; 427/376.3; 427/376.6; 427/383.5; 427/404; 427/419.3; 427/554; 427/555; 427/556; 428/298; 428/699
[58] Field of Search .............. 427/554, 555, 556, 269, 427/270, 275, 289, 292, 309, 327, 376.3, 376.6, 383.5, 404, 419.3; 428/167, 298, 699

[56] References Cited

U.S. PATENT DOCUMENTS 3,948,706  4/1976  Schmeckenbecher ............... 156/89
5,080,474  1/1992  Miyamoto ............................ 350/433

FOREIGN PATENT DOCUMENTS 2451485  6/1975  Germany ............................ 427/43

*Primary Examiner*—Bernard Pianalto
*Attorney, Agent, or Firm*—Jerome C. Squillaro; Charles L. Moore, Jr.

[57] ABSTRACT

A method for manufacturing a composite material comprises the steps of furnishing a layer of a matrix material, forming a groove in the matrix-material layer using a laser to remove material from the layer of matrix material in the form of a groove, and placing a reinforcement into the groove. Preferably, the surface of the layer of matrix material is smoothed with a laser beam prior to formation of the groove. In most instances, more than one layer is desired, and the steps of furnishing, forming, and placing are repeated, using the same or different materials, to build up a multilayer composite material. Cylindrical, flat, or curved panel composite materials can be readily prepared, using metal, intermetallic, or ceramic materials for the matrix.

20 Claims, 3 Drawing Sheets

METHOD FOR FABRICATION OF COMPOSITE MATERIALS AND COMPOSITE

BACKGROUND OF THE INVENTION

This invention relates to the fabrication of composite materials, and, more particularly, to the fabrication of composite materials using matrix materials that are difficult to machine.

A composite material is formed from two or more constituent materials that retain their physical form and identity in the composite material, as distinct from an alloy wherein the constituents lose their physical form and identity. The composite material can have various types of structure, but one commercially important type of composite material consists of elongated reinforcement fibers of one material embedded in a matrix of another material. The matrix material holds the fibers in the desired orientation, and protects the fibers from damage that may weaken the fibers. The interfaces between the fibers and the matrix can be controlled to achieve particular properties in the composite material.

The marty possible combinations of fiber type, fiber orientation, matrix type, and interfacial characteristics permit the properties of the composite material to be tailored to achieve specific properties and for particular design applications. As a result, composite materials have become increasingly important and widely used in products, particularly those that must achieve high performance standards combined with low material weight.

One of the important possibilities created by the use of composite materials is the improvement of materials that otherwise are difficult to use in applications by reducing the adverse effect of some undesirable property. For example, in the past it has been conventional design practice to use materials that are relatively ductile, In order to achieve fracture toughness in the final product. However, as products are developed for use at ever-higher temperatures, it is found that the only materials which can practically provide the required high-temperature strength and environmental stability are intermetallic compounds and ceramics which exhibit relatively low elongations to failure, and therefore may have inherently low fracture toughnesses. Although designers have learned to adapt their designs to materials of low ductility, there remains the desire to use high toughness materials. The toughness properties of intermetallic compounds and ceramics can be improved by embedding fibers within these materials to form a composite material.

In one approach to fabricating a composite article of reinforcing fibers in a matrix of an intermetallic compound or a ceramic, a layer of the matrix is first prepared. The reinforcing fiber or fibers are placed onto the matrix layer, and then another layer of the matrix is applied. These steps are repeated to gradually build up the layered composite article, One of the problems that arises as the composite article is fabricated is that it is difficult to hold the fiber or fibers in the proper location as the succeeding layer of matrix material is applied. No satisfactory technique has been developed, because tile fiber or fibers cannot be easily attached to the underlying layer of low-ductility matrix material, There therefore exists a need for an improved technique for fabricating composite materials by the layered buildup approach. Such a technique should permit the fabrication of composite materials having matrices of intermetallic compounds or ceramics of relatively low ductility. The present invention fulfills this need, and further provides related advantages.

SUMMARY OF THE INVENTION

The present invention provides a method for preparing a composite material by a layered buildup approach that is operable even when the matrix is a material of relatively low ductility that cannot be readily machined. The technique of the invention can be used with a wide variety of such materials, and permits the stepwise development of a composite material structure specifically tailored for a particular application. The reinforcement fiber is precisely placed and oriented as it is added to the composite structure, whether the composite is to be prepared as a figure of revolution, a flat plate, a curved panel, or other form.

In accordance with the invention, a method for manufacturing a composite material comprises the steps of furnishing a layer of a matrix material, forming a groove in the matrix-material layer using a laser to remove material from the layer of matrix material in the form of a groove, and placing a reinforcement into the groove. In the usual case, the process steps are repeated to build up a multilayered structure by furnishing a second layer of a second matrix material overlying the layer of matrix material and the reinforcement lying in the groove, forming a second groove in the second matrix-material layer using a laser to remove material from the second matrix-material layer in the form of a groove, and placing a second reinforcement into the second groove.

In one embodiment of the invention, the matrix layers are furnished by a spray process such as plasma spraying. The first layer of matrix material is sprayed onto a substrate or, in the case of a figure of revolution such as a cylindrical composite, onto a mandrel that is rotated during the spray process. Plasma spraying is a fast, economical approach for applying materials such as intermetallic compounds and ceramics that are of relatively low ductility, but other operable techniques are also acceptable.

Where the matrix layer is deposited by a spray technique, its surface typically rather rough and may have some surface irregularities. These irregularities, if present, can be removed or reduced in magnitude by melting and densifying the surface regions of the matrix layer using an appropriate laser such as a carbon dioxide laser.

A groove or grooves are cut into the surface of the matrix layer with an appropriate laser, preferably an ultraviolet excimer laser. The excimer laser utilizes very short energy pulse durations to remove material in a predefined pattern. The adjacent material remaining after the laser treatment is not disturbed or cracked. This feature is particularly advantageous where the matrix material has relatively low ductility, as laser-induced cracks could later propagate and lead to premature failure of the matrix material.

The reinforcement fiber or fibers are laid into the groove or grooves In the matrix material. The next layer of matrix material is applied and smoothed as necessary, the next set of grooves is cut using the laser, and the next set of reinforcement fibers is placed into the grooves. The process is repeated as many times as necessary to build up a layered composite material of the desired thickness and properties.

The approach of the invention permits the preparation of thick or thin composite structures to essentially their final form. It allows the composite material to be made of a single matrix material and single type of fiber, or several matrix material and fiber types. The geometry of each set of grooves and fibers can be varied as desired, and in each case the grooves hold the fibers in the proper locations until the next layer of matrix material is added. The spacing of the grooves and the thickness of the matrix layer determines the volume fraction of reinforcement fibers, placing this parameter within the control of the fabricator.

BRIEF DESCRIPTION OF THE DRAWINGS

FIG. 3 is a series of perspective views of a cylindrical composite article prepared by the process of FIG. 2, wherein

DETAILED DESCRIPTION OF THE PREFERRED EMBODIMENTS

Figure 1:
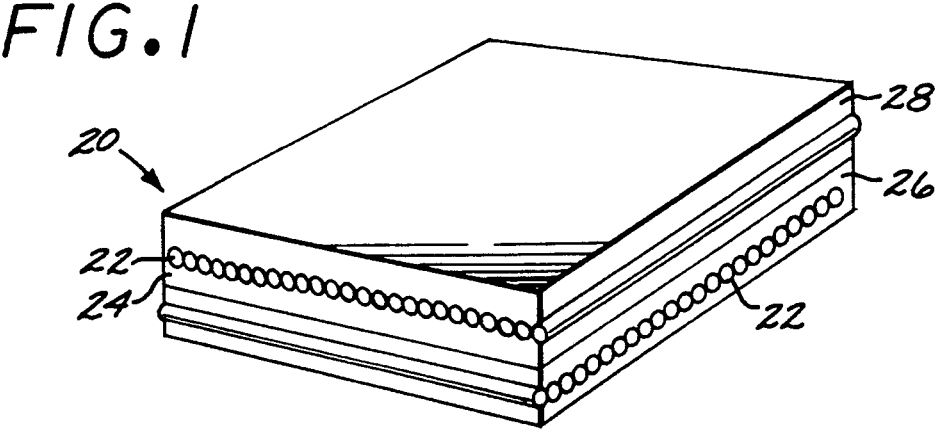
FIG. 1 is a perspective view of a composite material.

FIG. 1 illustrates a composite material article 20, having fibers 22 embedded in a matrix 24. In the article 20, there are two layers 26 and 28 of the matrix material, with the fibers 22 running at 90 degrees to each other in the two layers. As will be discussed in more detail, the present approach to preparation of composite material articles permits many different combinations of fiber materials, matrix materials, relative fractions of fiber and matrix, and orientations of the fibers to be used in the various layers. The invention is not limited as to any of these materials or arrangements as depicted herein for illustrative purposes.

Figure 2:
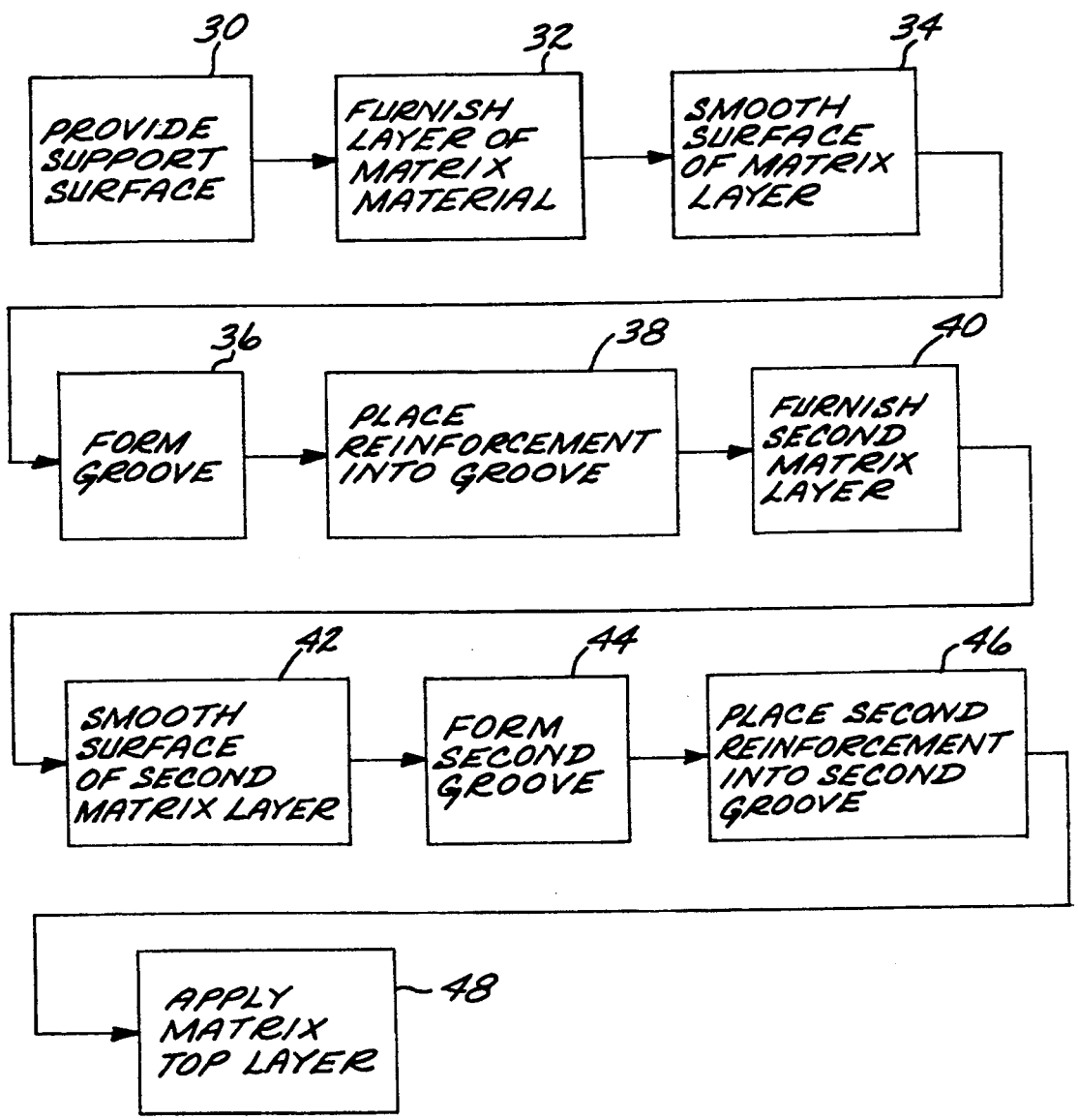
FIG. 2 is a flow chart for the preparation of a composite material by the approach of the invention.

FIG. 2 is a process flow chart for the method of preparation of a composite material article. The series of illustrations of FIGS. 3(a)-3(j) correspond to these various steps as applied to the preparation of the composite material article, which in tile illustrated case is a hollow cylinder. As an initial step, numeral 30 of FIG. 2, a support surface for fabrication of the article is provided. In the case of the cylinder of FIG. 3, the support surface is a cylindrical mandrel 50, but in other cases flat panel, curved panel, or other shapes of support surfaces could be used.

A layer of a first matrix material 52 is placed onto the surface of the mandrel 50, numeral 32 of FIG. 2. The layer 52 may be furnished by any operable procedure, and the matrix material may be any operable material. In a preferred embodiment, the matrix material is an intermetallic compound such as alpha-2 titanium aluminide (TiAl), including alloys thereof, or gamma titanium aluminide (Ti3Al), including alloys thereof. Alternatively, metals such as nickel-based superalloys or ceramics such as SiC or SiN may be used. The matrix material is used in conjunction with a technique suitable for its deposition or placement. For example, metals and intermetallics are typically applied by a spray process, while ceramics are applied by another process, such as a powder consolidation technique. These listed materials and processes are not limiting of the invention, but only illustrative of its scope.

In the preferred approach, the layer 52 is a titanium aluminide deposited by a spray procedure, and more specifically by plasma spraying. In plasma spraying, a well known industrial technique, a powder of the material to be sprayed is injected into a plasma. The powder, now partially or fully melted, is directed toward the target, in this case the mandrel 50, at a high velocity. The sprayed material impacts against the target surface and solidifies in place. The plasma gun source is typically moved in relation to the target during the spray operation, so that an even layer is gradually built up. In the illustrated case of FIG. 3, the mandrel 50 is rotated as the layer 52 is deposited and the plasma spray source is traversed parallel to the axis of the mandrel.

Figure 3A:
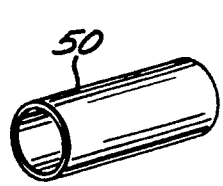
FIG. 3(a) depicts a support mandrel.
Figure 3B:
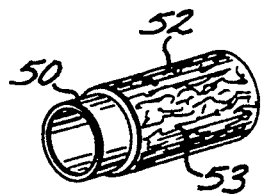
FIG. 3(b) depicts a first layer of matrix material deposited on the support mandrel.
Figure 3C:
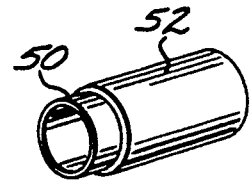
FIG. 3(c) depicts the first layer of matrix material having a smoothed surface.

When a layer 52 of material is deposited by plasma spraying, the upper surface of the layer 52 is typically rather rough, as indicated by asperities 53 in FIG. 3(b). These asperities 53 can be removed or reduced in height by an optional, but preferred, laser surface smoothing treatment, numeral 34 of FIG. 2. A high power laser beam is directed at the surface of the layer 52, so that the surface is heated and melted in the near-surface region. Upon resolidification, the surface region of the layer 52 is smoother and denser, and the asperities are removed or reduced in size, leaving the smooth surface depicted in FIG. 3(c). The preferred laser for smoothing the surface is a carbon dioxide laser of sufficient beam energy density to melt the upper surface regions of the material used in the layer 52. The laser surface treatment also aids in consolidating the matrix layer 52 to remove any voids that might have remained from the deposition process. With a carbon dioxide laser of 3000 watts and a beam size of about 0.150 inch diameter, a remelt depth of about 0.004 inches can be obtained at a traversing rate of 90 inches per minute.

Figure 3D:
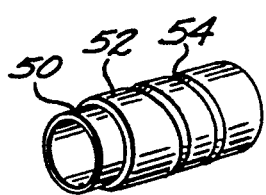
FIG. 3(d) depicts a groove in the first matrix layer produced by laser ablation.
Figure 3E:
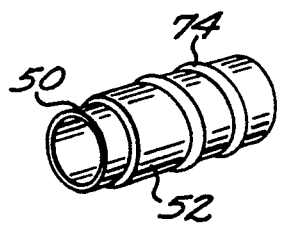
FIG. 3(e) depicts a fiber placed into the groove.

If fiber reinforcements were wrapped directly over the layer 52, they would not remain securely in place. Instead, the wound reinforcement could slip sideways on the smooth surface of the layer 52 and out of place, before another layer of matrix material could be added. To avoid this problem, a groove 54 is formed in the layer 52, see numeral 36 of FIG. 2. The groove 54, shown in FIG. 3(d), is cut by a laser beam, rather than mechanically. The preferred matrix materials of the layer 52 cannot be readily machined by conventional techniques, even with diamond tools.

The groove 54 is laser machined with a profile and depth selected to match the shape of the reinforcement fiber to be later placed into the groove. In the embodiment pictured in FIG. 3, a single spiral groove is cut. In other embodiments, a series of grooves may be cut, as where the reinforcement is to consist of a series of parallel fibers. In the case of the spiral groove 54 of FIG. 3(d), the spacing between the turns of the spiral, termed the pitch of the spiral, is selected to provide the required volume fraction of fiber reinforcement. That is, the closer the turns (shorter the pitch) of the spiral, the higher is the volume fraction of the reinforcement in the final composite material. As an example, in one application of the invention to prepare a spirally wrapped composite cylinder as shown in FIG. 3, the spiral groove 54 was generally semicircular with a width of about 0.006 inches, a depth of about 0.003 inches, and a pitch of 0.007-0.009 inches.

Figure 4:
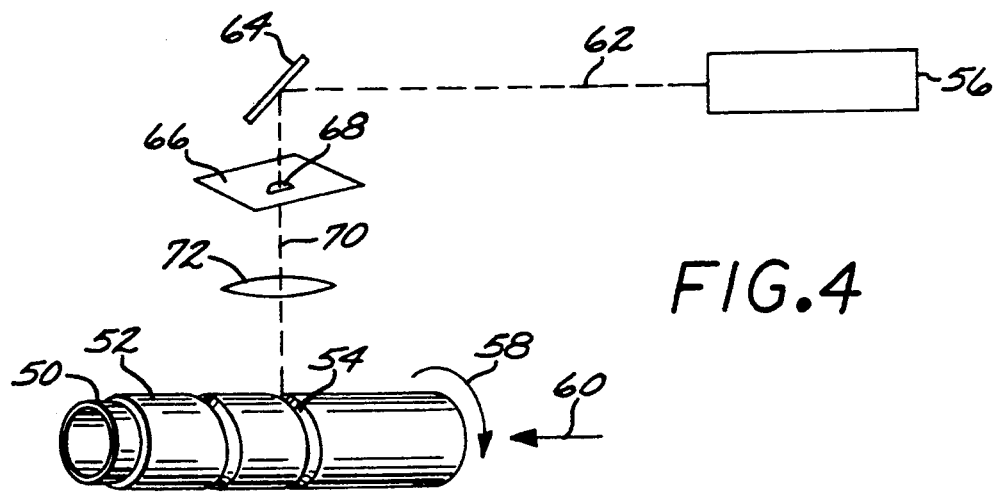
FIG. 4 is a diagrammatic view of a laser groove-cutting apparatus.

The groove 54 is preferable formed or cut with an excimer laser 56 operating through a mask to define the required material removal pattern, as shown in the schematic apparatus diagram of FIG. 4. The mandrel 50 and the matrix layer 52 are mounted on a lathe-like instrument that rotates the mandrel 50 about its cylindrical axis and translates the mandrel 50 parallel to the cylindrical axis. The instrument is not shown, but its function is indicated by the rotational arrow 58 and the translational arrow 60.

A laser beam 62 is provided by the excimer laser 56. An excimer laser is an ultraviolet laser with high photon energy and short pulse durations. The short pulses, about 20 nanoseconds in duration, are absorbed by the near-surface matrix material and remove that material by vaporization with little or no melting. It has been experimentally demonstrated that the excimer laser can cut generally semicircular grooves of depth 0.009 inches and width 0.006 inches in titanium alloys and other materials with no backsplatter and no significant cracking of the matrix material.

The beam 62 is directed to the proper orientation by a beam direction system, portrayed here as a mirror 64. The beam 62 is shaped by passage through a mask 66. The mask 65 has an opening 68 therethrough that defines the shape of a transmitted laser beam 70. The transmitted laser beam 70 is focused on the layer 52 and the image of the opening 68 reduced as necessary by an optical system, indicated as a lens 72. The laser beam 70 removes matrix material from the matrix layer 52 in the form of the groove 54, as the mandrel 50 is rotated and translated to define the groove. If, instead, a series of non-connected grooves were required, these could be readily cut by the same technique.

After the groove 54 is cut, a reinforcement fiber or wire 74 is laid into the groove 54, numeral 38 of FIG. 2. The groove may be cut so that the fiber 74 lies below the level of the upper surface of the matrix layer 52, or, as pictured in FIG. 3(e), the fiber 74 protrudes slightly above the surface of the matrix layer 52. This completes the first composite layer or, in the terminology sometimes used in the art, the first ply.

Figure 3F:
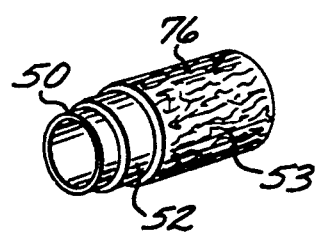
FIG. 3(f) depicts a second layer of matrix material deposited overlying the first layer and the fiber.
Figure 3G:
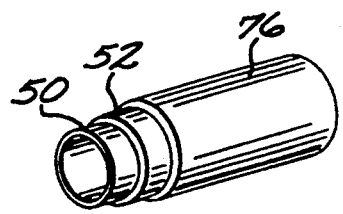
FIG. 3(g) depicts the smoothed surface of the second layer of matrix material.
Figure 3H:
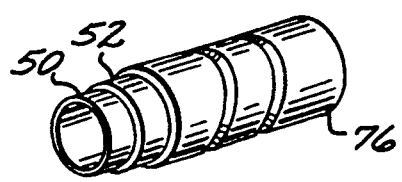
FIG. 3(h) depicts a second groove in the second matrix layer produced by laser ablution.
Figure 3I:
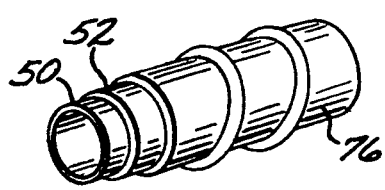
FIG. 3(i) depicts a second fiber placed into the second groove.
Figure 3J:
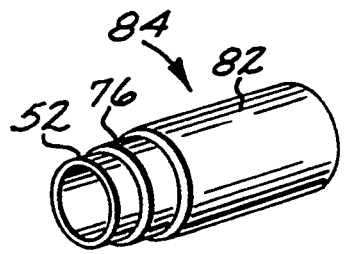
FIG. 3(j) depicts the final composite article after a surface layer has been deposited and the mandrel has been removed.

Subsequent plies are applied by a similar technique. As shown in FIG. 3(f) and indicated in FIG. 2 at numeral 40, a second matrix layer 76 of a second matrix material is deposited in generally the same manner as the first layer 52. The rough upper surface of the second matrix layer 76 may be smoothed in the same manner previously discussed, numeral 42 of FIG. 2, producing the smoothed layer 76 of FIG. 3(g). A second groove 78 is cut in the manner discussed previously, numeral 44 of FIG. 2 and as illustrated in FIG. 3(h). A second reinforcement fiber 80 is laid into the second groove 78, numeral 46 of FIG. 2 and FIG. 3(i). Finally, a matrix top layer 82 is added, numeral 48 of FIG. 2, and the mandrel 50 is removed, producing the final composite hollow cylindrical article 84 pictured In FIG. 3(j). (In FIG. 3, the layers 52, 76, and 82 have been shown as slightly stepped back relative to each other for purposes of illustration, but typically are fully coincident In an actual article.)

The approach of the invention is quite versatile. For example, in the composite article 84 the first matrix layer 52, the second matrix layer 76, and the top matrix layer 82 may be the same material or different materials. They may be metals, nonmetals, Intermetallic compounds, or ceramics. Similarly, the reinforcement fiber 74 and the second reinforcement fiber 80 may be the same material or different materials. The sizes of the reinforcement fibers 74 and 80 may be the same or different. The pitches of the spirals of the grooves 54 and 78 may be the same or different. The grooves 54 and 78 may be of the same or different senses. For the purpose of illustration, the groove 54 is made to be a right-hand spiral, and the groove 78 is a left-hand spiral, for example. The thicknesses of the matrix layers 52, 76, and 82 may be the same or different. The combination of layer thickness and groove spiral pitch permits the volume fraction of the reinforcement fiber in each ply to be controlled to be the same or different.

Figure 5:
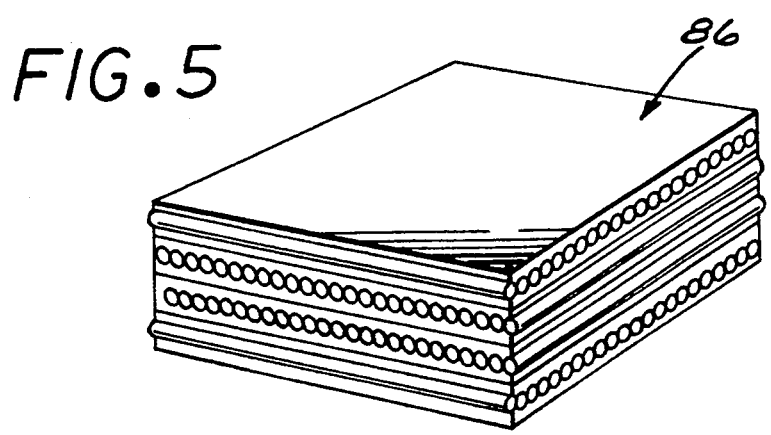
FIG. 5 is a perspective view of a composite material prepared by the approach of the invention in the form of a flat plate.
Figure 6:
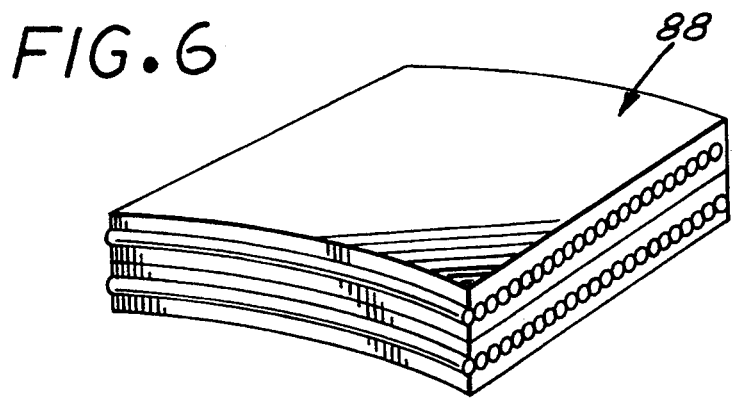
FIG. 6 is a perspective view of a composite material prepared by the approach of the invention in the form of a curved panel.

Moreover, the shape of the composite article may be varied through selection of the support surface upon which the article is deposited. FIG. 5 illustrates a flat panel composite article 86, and FIG. 6 illustrates a curved panel composite article 88. These shapes are achieved by using the appropriate flat or curved support surface for deposition of the first layer of matrix material. FIGS. 5 and 6 also illustrate some of the many reinforcement fiber arrangements possible with the present approach, which is fully versatile. In the article 86, the fibers are cross plied, with two central plies of the same orientation and two facing sheet plies of a different orientation. The article 88 of FIG. 6 has the reinforcing fibers of both plies oriented in the same direction.

The approach of the present invention provides a versatile technique for fabricating composite material articles that may be impossible to prepare by any other known approach, due to the physical characteristics of the matrix materials. This invention has been described in connection with specific embodiments and examples. However, it will be readily recognized by those skilled in the art the various modifications and variations of which the present invention is capable without departing from its scope as represented by the appended claims.

What is claimed is:

1. A method for manufacturing a composite material, comprising the steps of:
   furnishing a layer of a matrix material;
   forming a groove in the matrix-material layer using a laser to remove material from the layer of matrix material in the form of a groove; and placing a reinforcement into the groove.

2. The method of claim 1, including the additional step, after the step of furnishing and prior to the step of forming, of
   smoothing the surface of the matrix-material layer using a laser to melt and densify the surface of the matrix-material layer.

3. The method of claim 1, wherein the laser utilized in the step of forming is an excimer laser.

4. The method of claim 1, wherein the laser utilized in the step of smoothing is a carbon dioxide laser.

5. The method of claim 1, wherein the step of furnishing includes the step of
providing the layer of matrix material in the form of a hollow cylinder supported on a mandrel.

6. The method of claim 5, wherein the step of providing includes the step of
depositing the layer of matrix material using a spray process.

7. The method of claim 5, wherein the step of providing includes the step of
depositing the layer of matrix material by plasma spraying.

8. The method of claim 5, wherein the groove is in the form of a spiral on the outer surface of the hollow cylinder.

9. The method of claim 1, wherein the step of furnishing includes the step of
providing the layer of matrix material in the form of a flat sheet.

10. The method of claim 1, wherein the step of furnishing includes the step of
providing the layer of matrix material in the form of a curved sheet.

11. The method of claim 1, wherein the matrix material is a metal.

12. The method of claim 1, wherein the matrix material is an intermetallic material.

13. The method of claim 1, wherein the matrix material is a ceramic.

14. The method of claim 1, including the additional steps, after the step of placing, of
furnishing a second layer of a second matrix material overlying the layer of matrix material and the reinforcement lying in the groove;
forming a second groove in the second matrix-material layer using a laser to remove material from the second matrix-material layer in the form of a groove; and
placing a second reinforcement into the second groove.

15. The method of claim 14, wherein the second matrix material and the first matrix material are of the same composition.

16. The method of claim 14, wherein the second reinforcement and the first reinforcement are of the same composition.

17. A method for manufacturing a composite material comprising the steps of:
furnishing a layer of a matrix material;
smoothing the surface of the matrix-material layer using a laser to melt and densify the surface of the matrix-material layer;
forming a groove in the matrix-material layer to remove material from the layer of matrix material in the form of a groove;
placing a reinforcement into the groove;
furnishing a second layer of a second matrix material overlying the layer of matrix material and the reinforcement lying in the groove;
smoothing the surface of the second matrix-material layer using a laser to melt and densify the surface of the second matrix-material layer;
forming a second groove in the second matrix-material layer using a laser to remove material from the second matrix-material layer in the form of a groove; and
placing a second reinforcement into the second groove.

18. The method of claim 17, wherein the matrix material and the second matrix material are each selected from the group consisting of an intermetallic and a ceramic.

19. A composite material prepared by the method of claim 18.

20. The method of claim 1, wherein said reinforcement is a fiber.

* * * * *